US011829864B2

(12) United States Patent
Kwak et al.

(10) Patent No.: US 11,829,864 B2
(45) Date of Patent: *Nov. 28, 2023

(54) SYSTEMS AND METHODS FOR ENERGY-EFFICIENT ANALOG MATRIX MULTIPLICATION FOR MACHINE LEARNING PROCESSES

(71) Applicant: Analog Devices, Inc., Wilmington, MA (US)

(72) Inventors: Sung Ung Kwak, Frisco, TX (US); Robert Michael Muchsel, Addison, TX (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,320

(22) Filed: Nov. 8, 2022

(65) Prior Publication Data

US 2023/0121532 A1    Apr. 20, 2023

Related U.S. Application Data

(63) Continuation of application No. 16/590,272, filed on Oct. 1, 2019, now Pat. No. 11,494,625.

(Continued)

(51) Int. Cl.
*G06N 3/063* (2023.01)
*G06F 7/496* (2006.01)

(Continued)

(52) U.S. Cl.
CPC ............. *G06N 3/063* (2013.01); *G06F 7/496* (2013.01); *G06F 7/501* (2013.01); *G06F 9/3001* (2013.01);

(Continued)

(58) Field of Classification Search
CPC .... G06N 3/063; G06N 3/0635; G06N 3/0454; G06N 3/0481; G06N 3/08; G06N 20/00;

(Continued)

(56) References Cited

U.S. PATENT DOCUMENTS 10,970,441 B1 * 4/2021 Zhang .................... G06N 3/063
2009/0030964 A1   1/2009 Tada (Continued)

FOREIGN PATENT DOCUMENTS

| CN | 1132562 A | 10/1996 |
|---|---|---|
| CN | 107545305 A | 1/2018 |
| CN | 107832846 A | 3/2018 |

OTHER PUBLICATIONS

Chinese office action dated Sep. 1, 2023 in related Chinese patent application No. 201910949449.5, (29 pgs).

*Primary Examiner* — Dac V Ha
(74) *Attorney, Agent, or Firm* — North Weber & Baugh LLP; Michael North

(57) ABSTRACT

An energy-efficient multiplication circuit uses analog multipliers and adders to reduce the distance that data has to move and the number of times that the data has to be moved when performing matrix multiplications in the analog domain. The multiplication circuit is tailored to bitwise multiply the innermost product of a rearranged matrix formula generate a matrix multiplication result in form of a current that is then digitized for further processing.

20 Claims, 8 Drawing Sheets

Related U.S. Application Data

(60) Provisional application No. 62/740,691, filed on Oct. 3, 2018.

(51) Int. Cl.
　　*G06F 7/501*　　(2006.01)
　　*G06F 9/30*　　(2018.01)
　　*G06F 17/16*　　(2006.01)
　　*G06G 7/16*　　(2006.01)
　　*G06N 3/065*　　(2023.01)

(52) U.S. Cl.
　　CPC .......... *G06F 9/30036* (2013.01); *G06F 17/16* (2013.01); *G06G 7/16* (2013.01); *G06N 3/065* (2023.01)

(58) Field of Classification Search
　　CPC ........ G06F 7/496; G06F 7/501; G06F 9/3001; G06F 9/30036; G06F 17/16; G06G 7/16
　　See application file for complete search history.

(56) References Cited

U.S. PATENT DOCUMENTS

| | | | |
|---|---|---|---|
| 2021/0182465 A1* | 6/2021 | Langhammer | G06N 20/00 |
| 2022/0156469 A1* | 5/2022 | Wang | G06N 3/04 |

* cited by examiner

SYSTEMS AND METHODS FOR ENERGY-EFFICIENT ANALOG MATRIX MULTIPLICATION FOR MACHINE LEARNING PROCESSES

CROSS REFERENCE TO RELATED PATENT APPLICATIONS

The present application is related to and claims priority benefit under 35 U.S.C. § 120 and commonly-assigned U.S. patent application Ser. No. 16/590,272, filed on Oct. 1, 2019, entitled "Systems and Methods for Energy-Efficient Analog Matrix Multiplication for Machine Learning Processes," listing inventors Sung Ung Kwak and Robert Michael Muchsel, which application claims priority under 35 U.S.C. § 119(e) to U.S. Provisional Patent Application, Ser. No. 62/740,691, filed on Oct. 3, 2018, entitled "Systems and Methods for Energy-Efficient Analog Matrix Multiplication for Machine Learning Processes," listing inventors Sung Ung Kwak and Robert Michael Muchsel. Each reference mentioned in this patent document is incorporated by reference herein in its entirety.

TECHNICAL FIELD

The present disclosure relates generally to data processing. More particularly, the present disclosure relates to systems and methods for improving utilization of computing and memory resources when performing arithmetic operations such as matrix multiplications.

BACKGROUND

Machine learning is an exciting area of research and development that enables computation of algorithms infeasible in "classic" computing. Common machine learning implementations utilize conventional CPUs or graphics processing units (GPUs) that use registers and a cache to process data stored in memory and rely on a number of sequential software and hardware matrix manipulation steps, such as address generation, transpositions, bit-by-bit addition and shifting, for example, when converting multiplications into additions and outputting the result into some internal register. While producing correct results, this approach is very costly in terms of both power and time and oftentimes precludes the use of computationally intensive machine learning algorithms, especially, real-time applications for low-power applications, such as applications for battery-operated portable devices that are incompatible with power-hungry processors.

For example, computationally demanding applications such as matrix multiplications for fully connected networks oftentimes require a software function be embedded in the microprocessor. Software must access the same locations of a standard memory and read, re-fetch, and write the same data over and over again when performing matrix-multiply and related operations. This is computationally very burdensome and creates a bottleneck that significantly impacts the usability of machine learning applications. Currently, there exist no mechanisms that efficiently select, use, and reuse data, while avoiding the generation of redundant data. In short, conventional hardware and methods are not well-suited for the ever-increasing demands for speed and the performance required when performing a myriad of complex processing steps in real-time that involve large amounts of data.

Accordingly, what is needed are matrix multiplication systems and methods that process data efficiently in terms of energy, number of arithmetic operations and, thus, time, e.g., for relatively small computing devices that can take advantage of and integrate machine learning processes without undue energy burden or excessive hardware costs.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
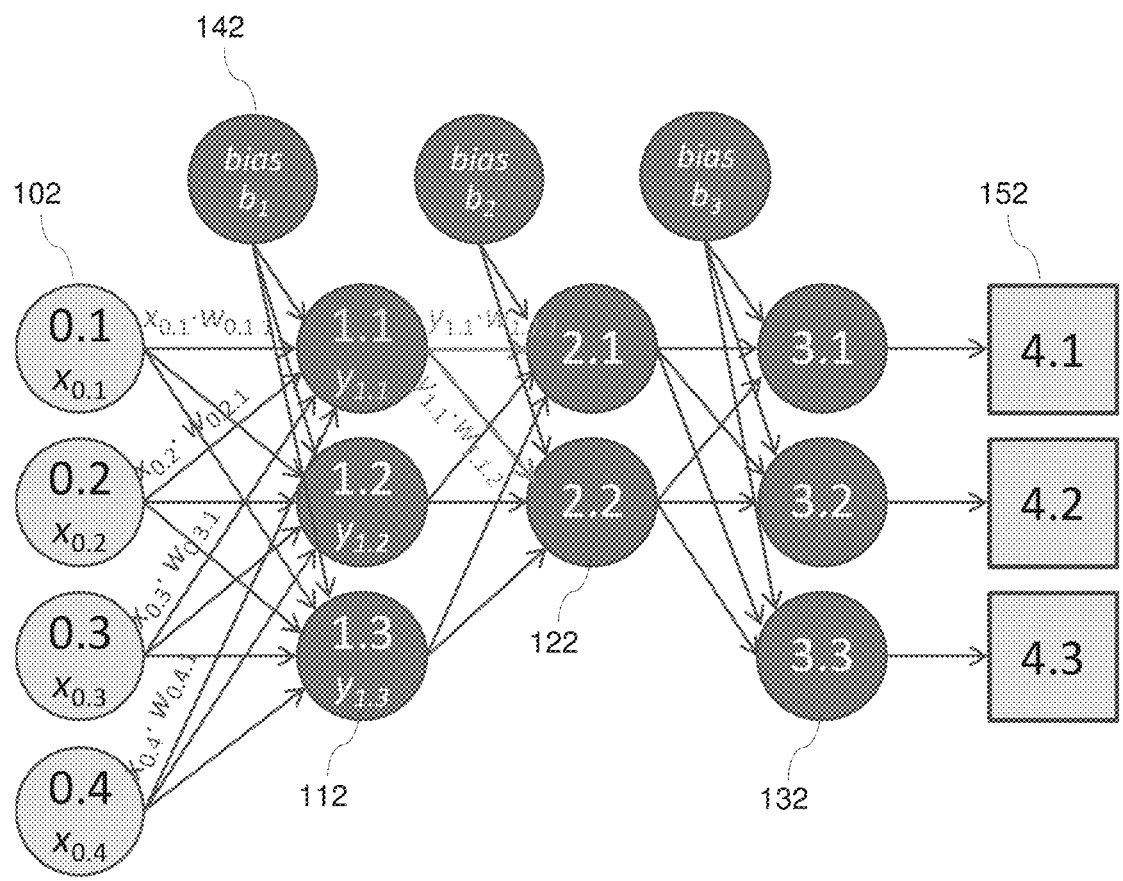
FIG. 1 is a simplified illustration of a common fully connected network that uses matrix multiplications.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

It is noted that components, or modules, shown in diagrams are illustrative of exemplary embodiments of the invention and are meant to avoid obscuring the invention. It is also understood that throughout this document components may be described as separate functional units, which may comprise sub-units, but those skilled in the art will recognize that various components, or portions thereof, may be divided into separate components or may be integrated together, including integrated within a single system or component. It is further noted that functions or operations discussed herein may be implemented as components. Components may be implemented in software, hardware, or a combination thereof.

Connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

In this document, the term "KT" is the acronym for Kirchhoff Teiler—a word combination of a reference to Kirchhoff's laws and the German word "Teiler" (meaning "factor," or "divider"). The terms "in-line," "in place," and "local" are used interchangeably. Further, the terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It is noted that embodiments described herein are given in the context of machine learning, but one skilled in the art shall recognize that the teachings of the present disclosure are not limited to machine learning hardware and may be applied to various other networks and applications that involve arithmetic operations, such as additions and multiplications that may be used in other contexts. Embodiments herein are discussed mainly in the context of fully connected layers. Yet, one of skill in the art will appreciate that this does not limit the present disclosure to such a particular type of neural network; rather, the teachings of the present invention may be equally applied to various other types of networks.

Popular machine learning algorithms involve a great number of matrix multiplication steps that, in practice, are responsible for most of the power (and time) consumption when performing computations, such as those required for an inference operation. As a person of skill in the art will understand, a matrix multiplication may be expressed as a sum of products. For example, the dot-product of vectors $\vec{u}=(a_1, \ldots, a_n)$ and $\vec{v}=(b_1, \ldots, b_n)$ is defined as $\vec{u} \cdot \vec{v} = a_1 b_1 + \ldots + a_n b_n$, regardless of whether the vectors are written as rows or columns. Assuming matrix $A=[a_{ij}]$ is an m×n matrix, and matrix $B=[b_{ij}]$ is an n×p matrix, then the product of the two matrices A and B results in a third m×p matrix $C=[c_{ij}]$, such that $$c_{ij} = row_i(A) \cdot col_j(B) = a_{i1} b_{1j} + \ldots + a_{in} b_{nj}.$$

FIG. 1 is a simplified illustration of a common fully connected network that uses matrix multiplications. Network 100 has four inputs 102 (denoted as 0.1, 0.2, 0.3, and 0.4), three hidden network layers 112-132 (denoted as 1.1, 1.2, 1.3 for layer 1; 2.1 and 2.2 for layer 2; and 3.1, 3.2, and 3.3 for layer 3), and three outputs 152 (denoted as 4.1, 4.2, and 4.3). It is pointed out that network 100 is used only for demonstration purposes and ease of illustration; practical machine learning models involve a great number of neurons. For a single neuron, $$y = g(xW+b) \text{ or } y_{j,k} = g(\Sigma_i x_i \cdot w_i + b) \quad \text{(Eq. 1)}$$

where g is an activation function (e.g., ReLU) that follows a great number of matrix multiplication steps, xi represents data elements, and wi represents weights or kernels. In example in FIG. 1, the output $y_{1.1}$ of neuron 1.1 is calculated as:

$$y_{1.1} = g\left(\sum_k x_i \cdot w_i + b\right) = g\left([x_{0.1} \ x_{0.2} \ x_{0.3} \ x_{0.4}] \cdot \begin{bmatrix} w_{0.1.1} \\ w_{0.2.1} \\ w_{0.3.1} \\ w_{0.4.1} \end{bmatrix} + b_1\right) \text{ or}$$

$$y_{1.1} = g(x_{0.1} w_{0.1.1} + x_{0.2} w_{0.2.1} + x_{0.3} w_{0.3.1} + x_{0.4} w_{0.4.1} + b_1) \quad \text{(Eq. 2)}$$

where $b_1$ is a bias value.

Sometimes, a full weight matrix is shown for the outputs of all neurons in a network layer.

For all neurons in layer 1:

$$\vec{y_1} = \vec{g}\left([x_{0.1} \ x_{0.2} \ x_{0.3} \ x_{0.4}] \cdot \begin{bmatrix} w_{0.1.1} & w_{0.1.2} & w_{0.1.3} \\ w_{0.2.1} & w_{0.2.2} & w_{0.2.3} \\ w_{0.3.1} & w_{0.3.2} & w_{0.3.3} \\ w_{0.4.1} & w_{0.4.2} & w_{0.4.3} \end{bmatrix} + b_1\right) \quad \text{(Eq. 3)}$$

As an example, if $$x = [1 \ 2 \ 3 \ 4], W = \begin{bmatrix} 1 & 2 & 3 \\ 4 & 5 & 6 \\ 7 & 8 & 9 \\ 10 & 11 & 12 \end{bmatrix}, b = -75, \text{ and } g() = ReLU(), \text{ then}$$

$$xW =$$

$$[1 \cdot 1 + 2 \cdot 4 + 3 \cdot 7 + 4 \cdot 10 \quad 1 \cdot 2 + 2 \cdot 5 + 3 \cdot 8 + 4 \cdot 11 \quad 1 \cdot 3 + 2 \cdot 6 + 3 \cdot 9 + 4 \cdot 12] = [70 \ 80 \ 90]$$

$$y = g(xW + b) =$$

$$ReLU([70 - 75 \quad 80 - 75 \quad 90 - 75]) = ReLU([-5 \ 5 \ 15]) \text{ and, finally, } y = [0 \ 5 \ 15].$$

The output of network layer 1 (i.e., $y_1=0$, $y_2=5$, and $y_3=15$) then serves as the input for the next network layer, layer 2. The data values from the last layer—in the example in FIG. 1, layer 3—may then be collected, e.g., by software, and used directly or serve as input for a classification function, such as softmax. It is noted that all examples, values, and results are provided by way of illustration.

Accordingly, neither these examples nor their results shall be used to limit the scope of the present disclosure.

As indicated in the Background section, when implemented in standard hardware, sums of products in matrix multiplication operations are computed sequentially, thus, the number of operations and, thus, the energy impact $O(n^2)$ increase with the size of the network used in the algorithm, with n representing the number of neurons in the network. Given the fact that typical machine learning algorithms require anywhere from thousands to millions of matrix multiplications, parallelism and the reduction of the energy impact of arithmetic operations should be of utmost importance when designing for low-power machine learning and similar applications.

Therefore, to facilitate an energy-efficient implementation, various embodiments integrate storage elements, e.g., memory or register cells, with analog circuits and sub-circuits to facilitate, among other things, in-place computations. By reducing the distance that data has to move and reducing the number of times the data has to be moved, advantageously, the energy requirements to perform computation tasks is greatly reduced.

Analog implementations of multipliers and adders may benefit systems and methods, such as those disclosed in U.S. Provisional Patent Application No. 62/740,679, entitled "ENERGY-EFFICIENT TORNADO MEMORY SYSTEMS AND METHODS," naming as inventors Mark Alan Lovell and Robert Michael Muchsel, and filed Oct. 3, 2018, U.S. Provisional Patent Application No. 62/740,700, entitled "SYSTEMS AND METHODS FOR ENERGY-EFFICIENT DATA PROCESSING," naming as inventors Mark Alan Lovell, Robert Michael Muchsel, and Donald Wood Loomis III, and filed Oct. 3, 2018, which applications are hereby incorporated herein by reference as to their entire content and for all purposes. Conversely, such systems and methods may be freely combined with the energy-efficient analog matrix multiplication systems and methods disclosed herein.

Figure 2:
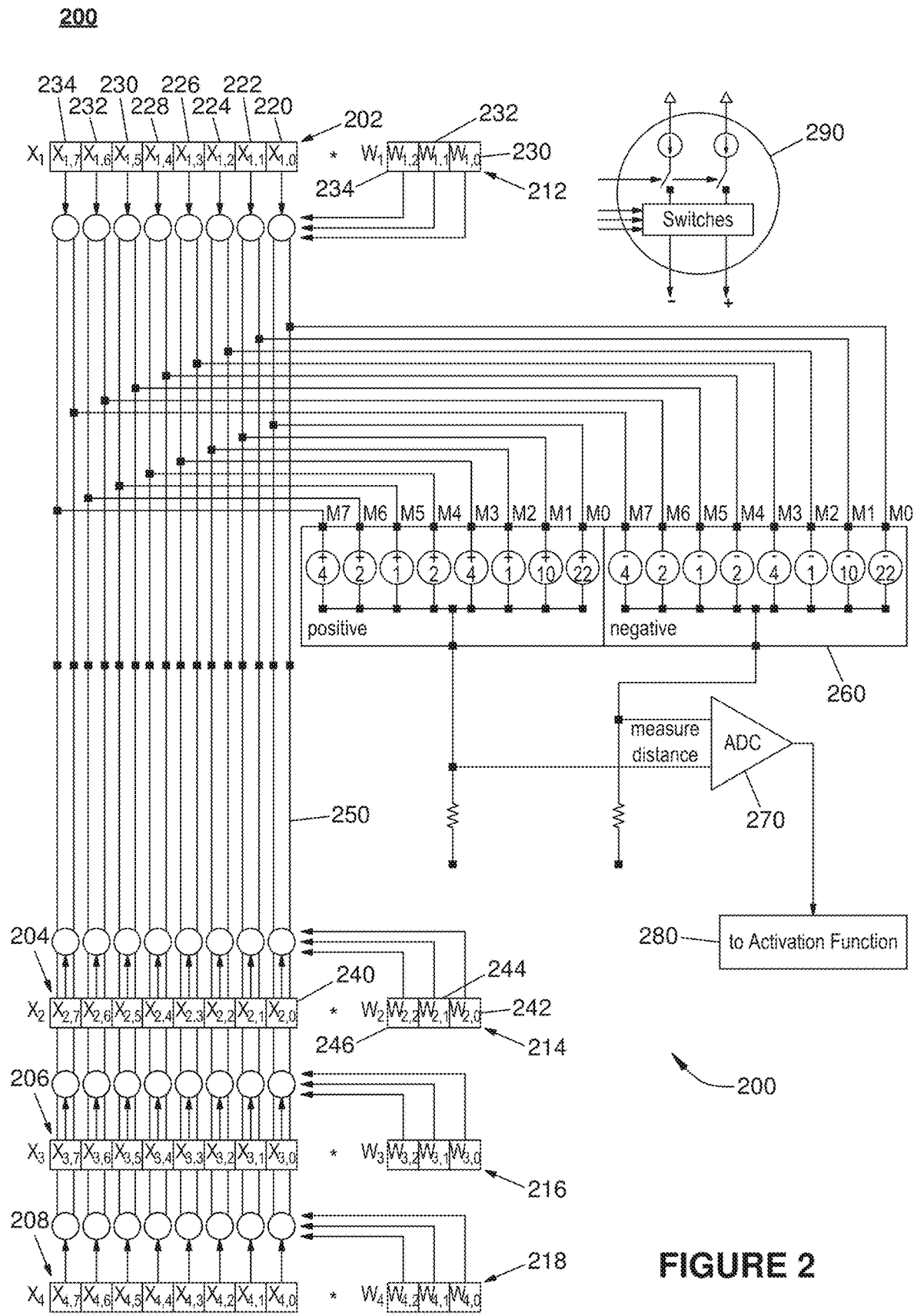
FIG. 2 illustrates an exemplary matrix multiplication system according to various embodiments of the present disclosure.

FIG. 2 illustrates an exemplary matrix multiplication system according to various embodiments of the present disclosure. Components in FIG. 2 are chosen for convenience of description and ease of illustration. Matrix multiplication system 200 comprises 256 8-bit data items, $x_1$ through $x_{256}$ (FIG. 2 shows only four data items 202-208 arranged in an 8-bit wide arrays); 256 3-bit weights, $w_1$ through $w_{256}$ (FIG. 2 shows only four weights 212-218 arranged in 3-bit wide arrays); 2048 KT elements 290; magnitude adjustment circuit 260; ADC 270; and activation function unit 280. It is noted that embodiments of the present disclosure may use any number of structures, for example, for layout efficiency and capacity reasons.

In embodiments, matrix multiplication system 200 provides for analog multiplication of weight-data pairs and analog addition of resulting products. In operation, data point (e.g., 220, labeled $x_{1,0}$) in data item 202 may be multiplied with weight $w_1$ 212 that has 3 weight bits 230-234 (labeled $w_{1,2}$, $w_{1,1}$, $w_{1,0}$). Similarly, data point 240 (labeled $x_{2,0}$) in data item 204 may be multiplied with weight $w_2$ 214 that has 3 weight bits 242-246 (labeled $w_{2,2}$, $w_{2,1}$, $w_{2,0}$). In embodiments, the products of these two multiplications may then be added in the analog domain, e.g., by adding analog currents on line 250. It is understood that any number of products, here 256, may be added. In short, a single bit may be multiplied by its weight and added to other single bits that are multiplied by their respective weights. The process may be repeated for all data bits, here 8 bits.

In embodiments, given n-bit data items $x_i$ (e.g., 202) and associated weights $w_i$ (e.g., 212) in Eq. 1 above may be expanded and rearranged in a manner such that represents the bits j of data word $x_i$ and each data bit j is separately multiplied by the full weight $w_i$. The resulting weighted single bits j may then be summed over all i before being summed over all j, as follows:

$$y_{j,k} = g\left(\sum_i x_i \cdot w_i + b\right) = \quad \text{(Eq. 4)}$$

$$g\left(\sum_i \left(\sum_{j=0}^n x_{i,j} \cdot 2^j\right) \cdot w_i + b\right) = g\left(\sum_{j=0}^n \left(\sum_i x_{i,j} \cdot w_i\right) \cdot 2^j + b\right)$$

In this manner, advantageously, the bit-line weighting, $2^j$, may be rearranged into an equivalent format that is more efficient to compute, while still accomplishing the objectives of the matrix-multiplication according to Eq. 1.

In embodiments, circuit 260 may be used to weigh the bits in a data item (e.g., 202) with positive or negative numbers, e.g., by dividing bit 220 by a factor of 32, dividing bit 222 by a factor of 16, dividing bit 224 by a factor of 8, dividing bit 226 by a factor of 4, dividing bit 228 by a factor of 2, dividing or multiplying bit 230 by a factor of 1, multiplying bit 232 by a factor of 2, and multiplying bit 234 by a factor of 4. As a result, the output generated by circuit 260 answers the question what the sum of the partial products in Eq. 1 is. In other words, the analog output of circuit 260 represents an accumulation of partial dot products that is the mathematical result of a matrix-multiplication.

In embodiments, it is desirable to obtain a digital representation of the result. To this end, as shown in FIG. 2, the analog result may be passed to, e.g., a shared ADC 270 that converts the analog result into a digital format that may then be digitally processed. It is noted that although FIG. 2 depicts a differential ADC that, for accuracy reasons, may be used to digitize the multiplication result, e.g., to 8-bits, alternate digitization techniques are equally feasible.

In embodiments, the digitized result may then be submitted to activation function unit 280 that may utilize hardware accelerators (not shown) to obtain the result(s) for Eq. 1. In embodiments, activation function unit 280 may operate in the analog domain and may use a relatively simple activation function, such as ReLU.

Similarly, a bias, b, may be utilized, e.g., as current offset to the input of ADC 270, a digital offset, a digital adder to the output of ADC 270, an offset inside activation function unit 280, or a separate weight item, e.g., with a corresponding fixed data item representing the value 1.0.

Matrix multiplication system 200 and its components illustrated in FIG. 2 are not limited to the constructional detail shown there or described in the accompanying text. For example, as those skilled in the art will appreciate, circuit 260 may be implemented many different ways, e.g., without explicitly separating positive and negative numbers and instead using positive and negative currents. Similarly, differential ADC 270 may be replaced by any other suitable ADC that can perform a current conversion from analog to digital. Also, a wide variety of activation functions circuits, such as Leaky ReLU and sigmoid, may be used by activation function unit 280. Further, in embodiments, current may be converted into voltage, e.g., by charging capacitors, etc. Since ReLU is defined simply as $g(x)=\max(0, x)$, ADC 270 may be modified accordingly to integrate activation function 280.

Figure 3:
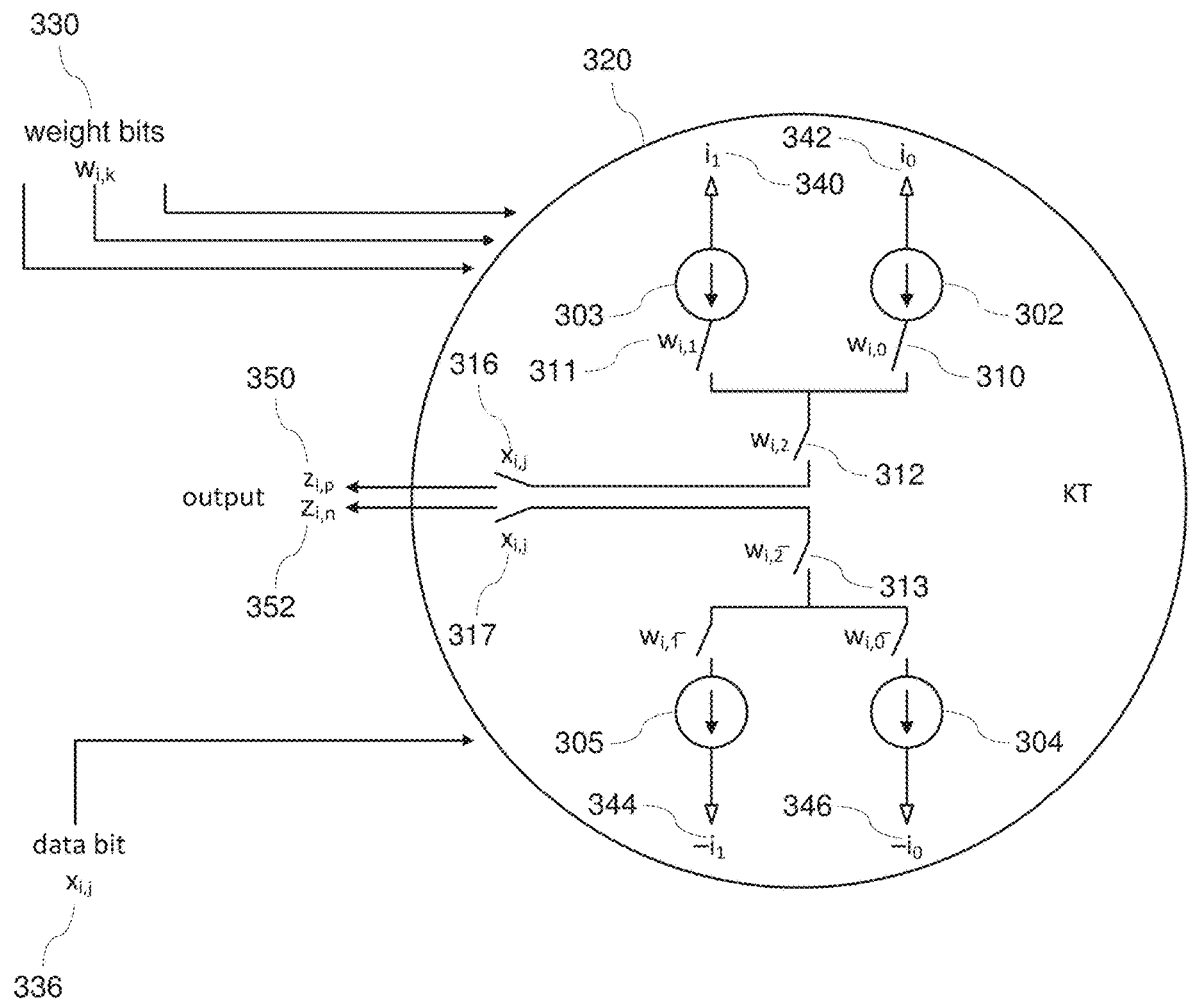
FIG. 3 illustrates an exemplary analog multiplication circuit according to various embodiments of the present disclosure.

FIG. 3 illustrates an exemplary analog multiplication circuit according to various embodiments of the present disclosure. Circuit 300 comprises KT element 320 that comprises current sources 302-305 and switches 310-317. Currents 340-346 in FIG. 3 are labeled $i_1$, $i_0$, $-i_1$, and $-i_0$. Switches $w_{i,0}$ 310 and $w_{i,1}$ 311 may be viewed as representing weight bits for their respective currents $i_0$ 342 and $i_1$ 344; $w_{i,2}$ 312 may be viewed as sign bit, and switch $x_{i,j}$ 316, 317 may be viewed as representing a data bit. In embodiments, for negative currents, $-i_0$ and $-i_1$, weights 314, 315 are negated. In embodiments, currents, e.g., $i_0$ and $i_1$, may have different values. For example, the current for $i_0$ may be 50 nA while the current for $i_1$ is 100 nA.

FIG. 3 illustrates a 3-bit weight comprising a sign bit (e.g., 312) and two magnitude bits (e.g., 310, 311). However, it is understood that KT element 320 may be implemented using any number of weight bits—with or without sign bit. One or more reference currents may be switched on, based on the state of weight bits $w_{i,k}$ and the state of data bit $x_{i,j}$.

In operation, KT element 320 multiplies a single bit j of a given data item $x_i$, represented as data bit $x_{i,j}$ 336 in FIG. 3, with a weight $w_i$, represented as weight bit $w_{i,k}$ 330, according to the innermost product in Eq. 2, to produce $x_{i,j} \cdot w_i$. In embodiments, KT multiplication occurs in the analog domain. Two outputs are depicted in FIG. 3, one positive current output, $z_{i,p}$ 350, and one negative current output, $z_{i,n}$ 352. In embodiments, each output 350, 352 may result from the summation of zero, one, or two currents.

In embodiments, individual currents may be related by powers of 2 or any other combination to represent the value of w. As may be easily gleaned from FIG. 3, output 350, 352 is 0 whenever data bit $x_{i,j}$ is 0, as would be expected from a multiplication with zero. Conversely, when $x_{i,j}$ is 1, output 350, 352 is the summation of $w_{i,k}$ 330 with currents $i_1$ 340 and $i_0$ 342. In detail, if sign-bit $w_{i,2}$ 312 is 0 (positive sign), then output 350 $z_{i,p} = w_{i,1}*i_1 + w_{i,0}*i_0$ and $z_{i,n}=0$, and if sign-bit $w_{i,2}$ 312 is 1 (negative sign), then output 350 $z_{i,p}=0$ and $z_{i,n}=w_{i,1}*-i_1+w_{i,0}*-i_0$. In embodiments, the magnitude of $i_0$ and $i_1$ is chosen such that $i_1=2*i_0$, such that a binary multiplication scheme in the analog domain results. However, it is noted that weights $w_i$ 330 need not necessarily be expressed as binary weights. In other words, currents need not be related by powers of 2 and enable a binary data representation. In embodiments, the ratio of currents may be different following the weight representation.

In embodiments, the inner addition term of Eq. 2, $\Sigma_i x_{i,j} \cdot w_i$ is implemented by summing currents to output $z_{i,p}$ 350 and $z_{i,n}$ 352 using Kirchhoff's current law for each data bit j and all i, while keeping positive and negative currents separate. In embodiments, as shown in FIG. 3, the positive and negative currents $z_{i,p}$ 350 and $z_{i,n}$ 352 may then be weighted based on their bit position. For a binary representation, as is shown in the example, weights are arranged in powers of two. This satisfies the weighting term $(\Sigma_i x_{i,j} \cdot w_i) \cdot 2^j$ of Eq. 2. FIG. 3 shows a particular weighting scheme for the individual bits. Advantageously, this embodiment may prevent overflow in a subsequent step, such as a digitization step. Alternate variations of term weighting are envisioned and may also use Kirchhoff's current law to add weighted terms when deriving the answer, $\Sigma_{j=0}^n (\Sigma_i x_{i,j} \cdot w_i) \cdot 2^j$.

One skilled in the art will recognize the teaching of the present disclosure may be implemented in systems using any number of currents, including both positive and negative currents, e.g., only positive or only negative currents, mirrored currents, and the like.

Figure 4:
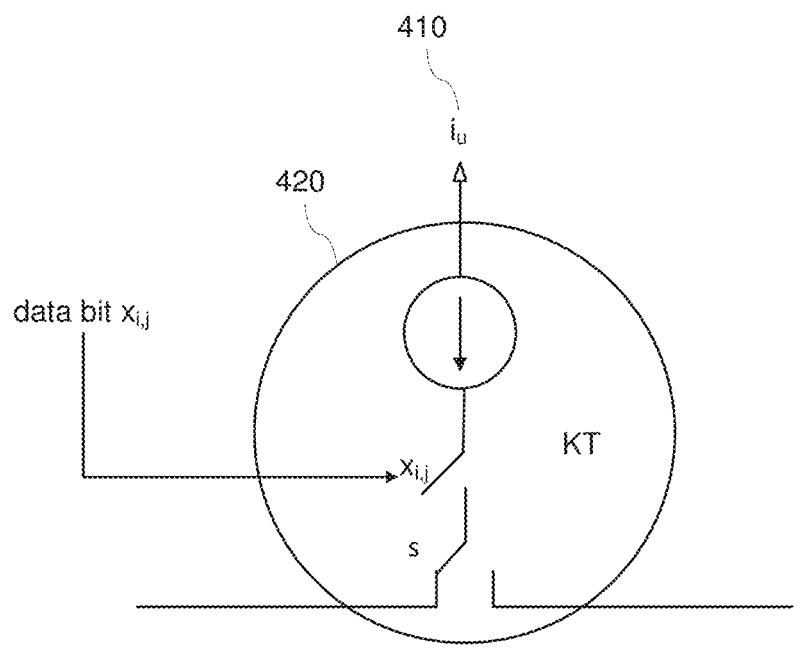
FIG. 4 illustrates a simplified analog multiplication circuit according to various embodiments of the present disclosure.

FIG. 4 illustrates a simplified analog multiplication circuit according to various embodiments of the present disclosure.

In embodiments, the KT elements shown in FIG. 3 may be further simplified to KT element 420 as shown in FIG. 4, such that, as discussed with reference to FIG. 6, a single "unit" current $i_u$ 410 may be used.

Figure 5:
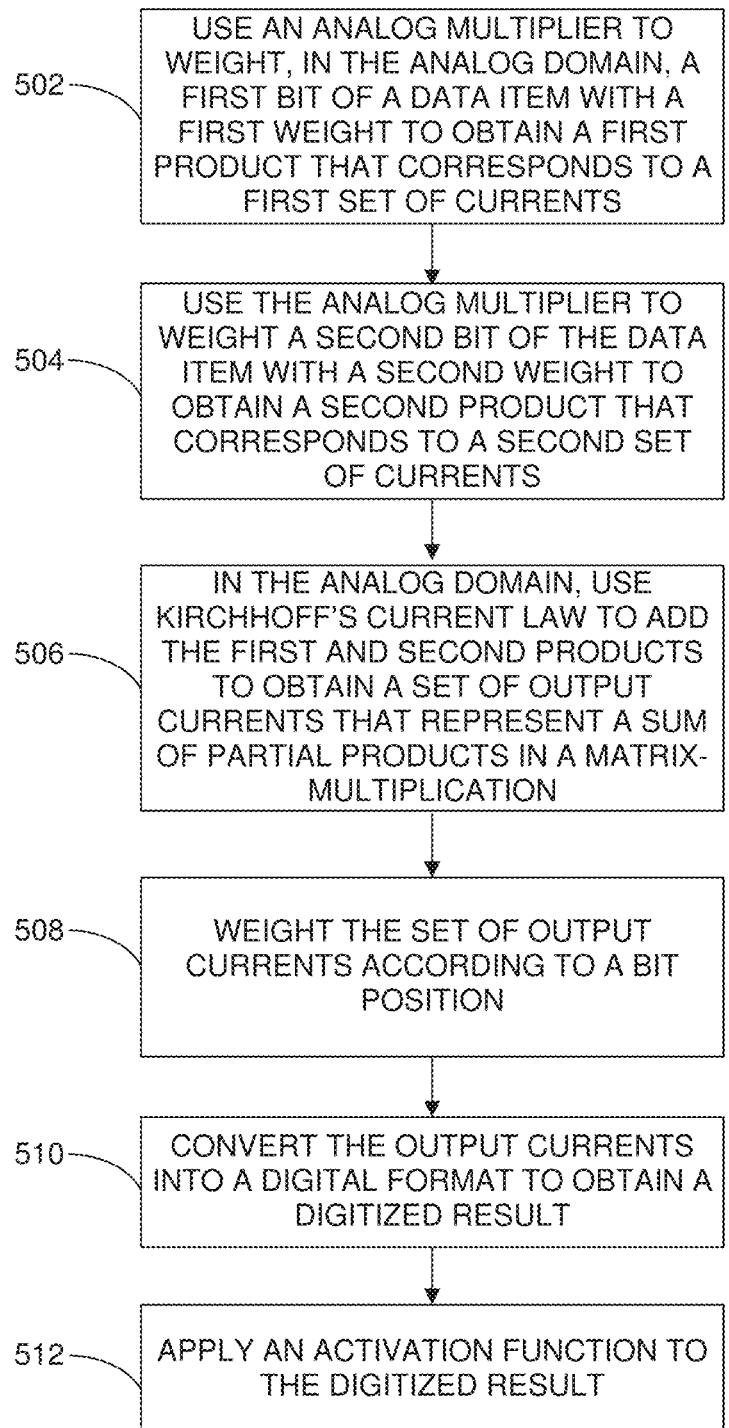
FIG. 5 is a flowchart of an illustrative process for performing matrix multiplication operations in accordance with various embodiments of the present disclosure by utilizing a matrix multiplication system as shown in FIG. 2.

FIG. 5 is a flowchart of an illustrative process for performing matrix multiplication operations in accordance with various embodiments of the present disclosure by utilizing a matrix multiplication system as shown in FIG. 2. Process 500 begins, when at step 502, when an analog multiplier is used to weight, in the analog domain, a first bit of a data item with a first weight to obtain a first product that corresponds to a first set of currents.

At step 504, the analog multiplier is used to weight a second bit of the data item with a second weight to obtain a second product that corresponds to a second set of currents.

At step 506, Kirchhoff's current law is used to add the first and second products to obtain a set of output currents that represent a sum of partial products in a matrix-multiplication.

At step 508, the set of output currents is weighted according to a bit position.

At step 510, the output currents are converted into a digital format to obtain a digitized result.

At step 512, an activation function is applied to the digitized result.

It is noted that: (1) certain steps may optionally be performed; (2) steps may not be limited to the specific order set forth herein; (3) certain steps may be performed in different orders; and (4) certain steps may be done concurrently herein.

In embodiments, weights may be moved from the analog domain into the digital domain. FIG. 6 illustrates an exemplary matrix multiplication system that uses column weights according to various embodiments of the present disclosure. For clarity, components similar to those shown in FIG. 2 are labeled in the same manner. For purposes of brevity, a description or their function is not repeated here. Matrix multiplication system 600 comprises ADC 670, digital multiplier 672, column weight 674, column adder 676, and activation function unit 678.

In embodiments, ADC 670 converts multiplied data 660 into the digital domain, such that digital multiplier 672 and digital column adder 676 may be used. However, this is not intended as a limitation on the scope of the intention. As one of skill in the art will appreciate that analog multipliers and column adders may be utilized and placed before ADC 670.

Figure 6:
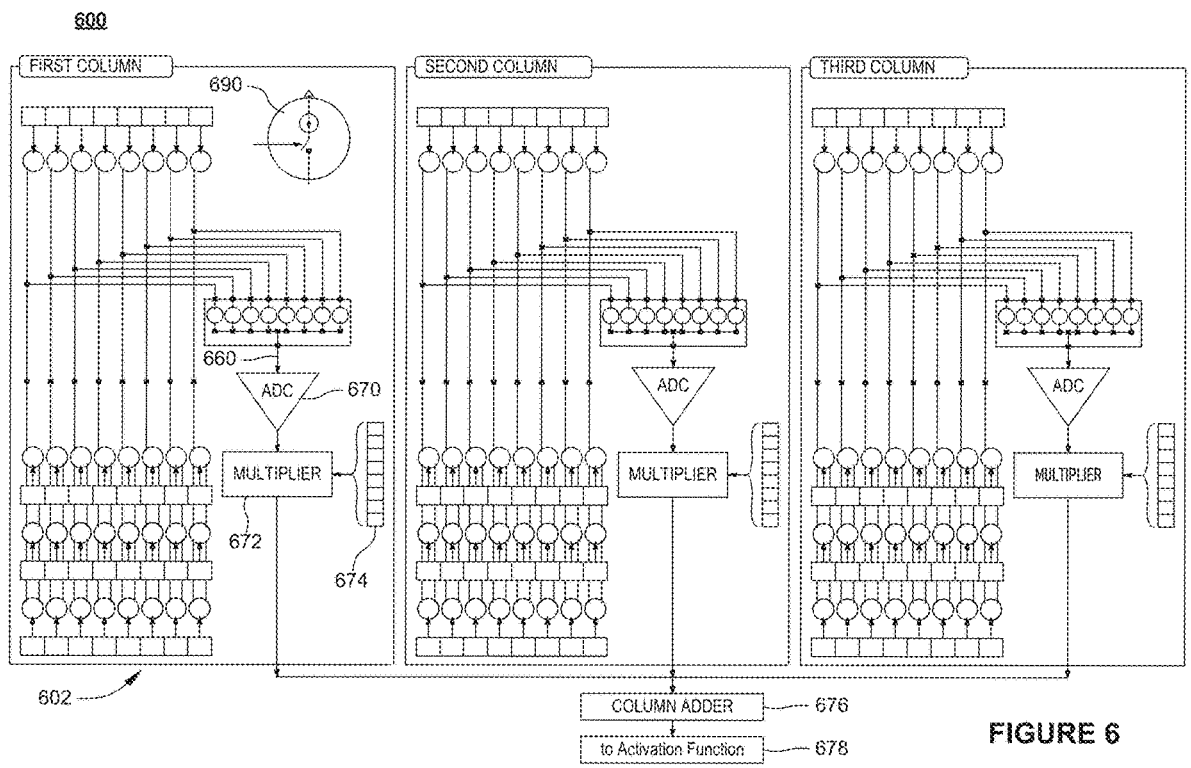
FIG. 6 illustrates an exemplary matrix multiplication system that uses column weights according to various embodiments of the present disclosure.

When compared with embodiments illustrated in FIG. 2, the use of column weights 674 in FIG. 6 avoids storing, e.g., 3-bit weight data with each data item.

Further, unlike the system in FIG. 2 that pairs several currents and weights with data items, system 600 in FIG. 6 allows for grouping and sharing several weight terms. Furthermore, the number of currents and the size of weights in column weight 674 may be increased or decreased.

In detail, system 600 in FIG. 6 arranges the $x_i \cdot w_i$ terms by the value of weights $w_i$. Since the $w_i$ may be predetermined (unlike the $x_i$ that are either inputs to the algorithm or that are the results of prior steps of the algorithm), several columns 674 of processing structures may be created, such that one group of $w_i$ 674 may be used per column (but possibly several columns per $w_i$). Mathematically, $y'_{j,k} = \Sigma_i x_i \cdot w_i$ may be expressed as:

$$y'_{j,k} = \Sigma_m (w_m \cdot \Sigma_p x_{m,p}) \quad \text{(Eq. 5)}$$

where m denotes the columns, $w_m$ is the particular column's weight, and p iterates over all data elements of the column m, such that $x_{m,p}$ represents an individual data item for column m.

This means that the complexity of KT elements 690 may be reduced as shown in FIG. 4, such that a single unit current, $i_u$, is used. This unit current need no longer be proportional to the weight and may be optimized for computation accuracy and power efficiency. In embodiments, KT element 690 is on or off, depending on the state of the data bit, and data bits are simply counted, such that for each data bit that is on, the respective current may be added to the output current. For the data bits, here 256, that may be "0" or "1," up to 256 data bits may be "on" so as to count the number of data bits that are set to "1." In other words, the result of the count may go from 0 (i.e., no data bit set to "1") to 256 inclusive (i.e., all data bits set to "1").

It is noted that FIG. 6 illustrates one possible implementation. For example, more or fewer components than shown may be placed inside column weight 674 to be shared across all columns.

Figure 7:
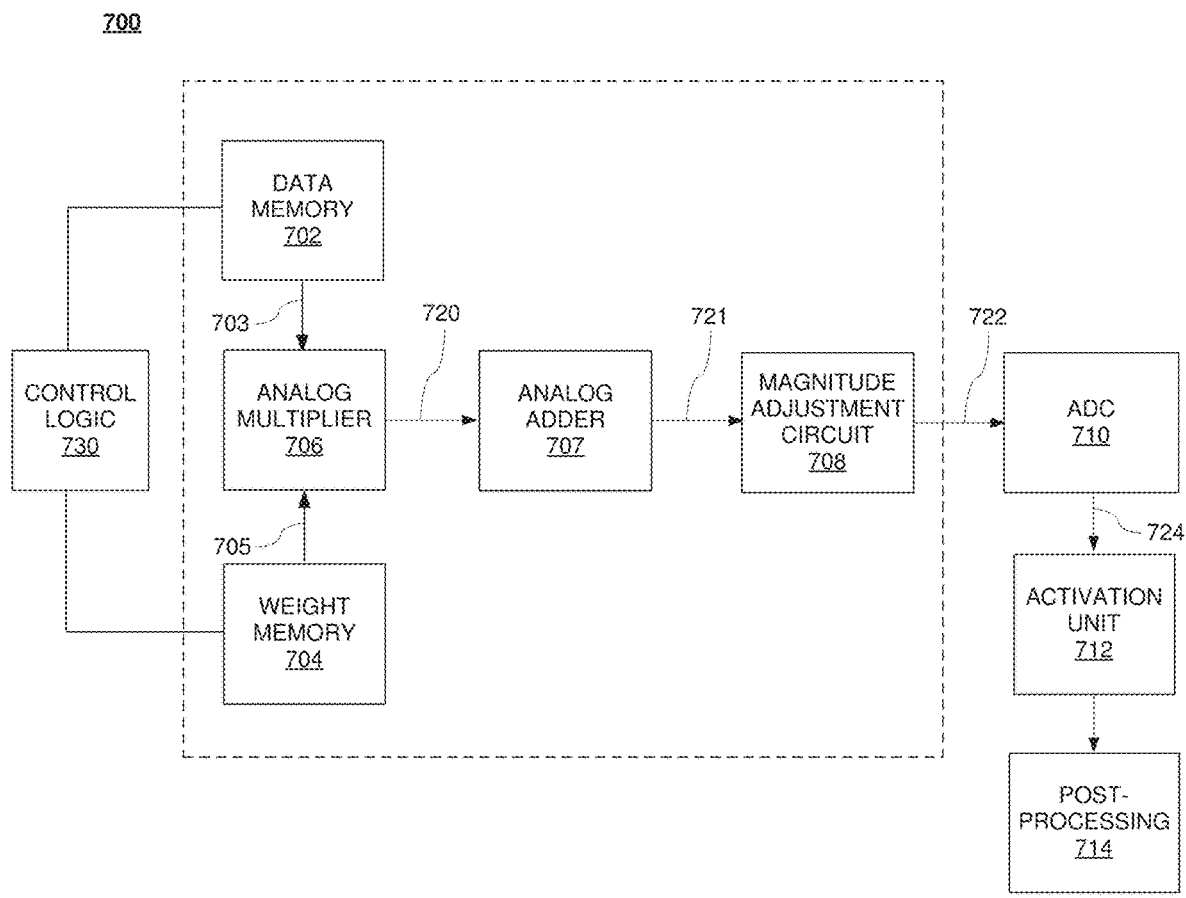
FIG. 7 illustrates a simplified system utilizing matrix multiplication according to various embodiments of the present disclosure.

FIG. 7 illustrates a simplified system utilizing matrix multiplication according to various embodiments of the present disclosure. System 700 comprises data memory 702, weight memory 704, analog multiplier 706, magnitude adjustment circuit 708, ADC 710, activation unit 712, post-processing unit 714, and controller 730.

In operation, analog multiplier 706 may retrieve data 703 and weight 705 from data memory 702 and weight memory 704, respectively. In embodiments, analog multiplier 706 may multiply, in the analog domain, at least some of data 703 and weight 705 to generate products 720. In embodiments, products 720 are accumulated via analog adder 707, and magnitude adjustment circuit 708 may adjust magnitudes of accumulated products 721 and output adjusted products 722 that may then be converted, e.g., by ADC 710, into a digital format 724. In embodiments, activation unit 712 may apply activation function(s), and post-processing unit 714 may apply one or more post-processing steps to the products, e.g., in accordance with a matrix multiplication. It is understood that some of all of the process steps may be orchestrated by controller 730.

Figure 8:
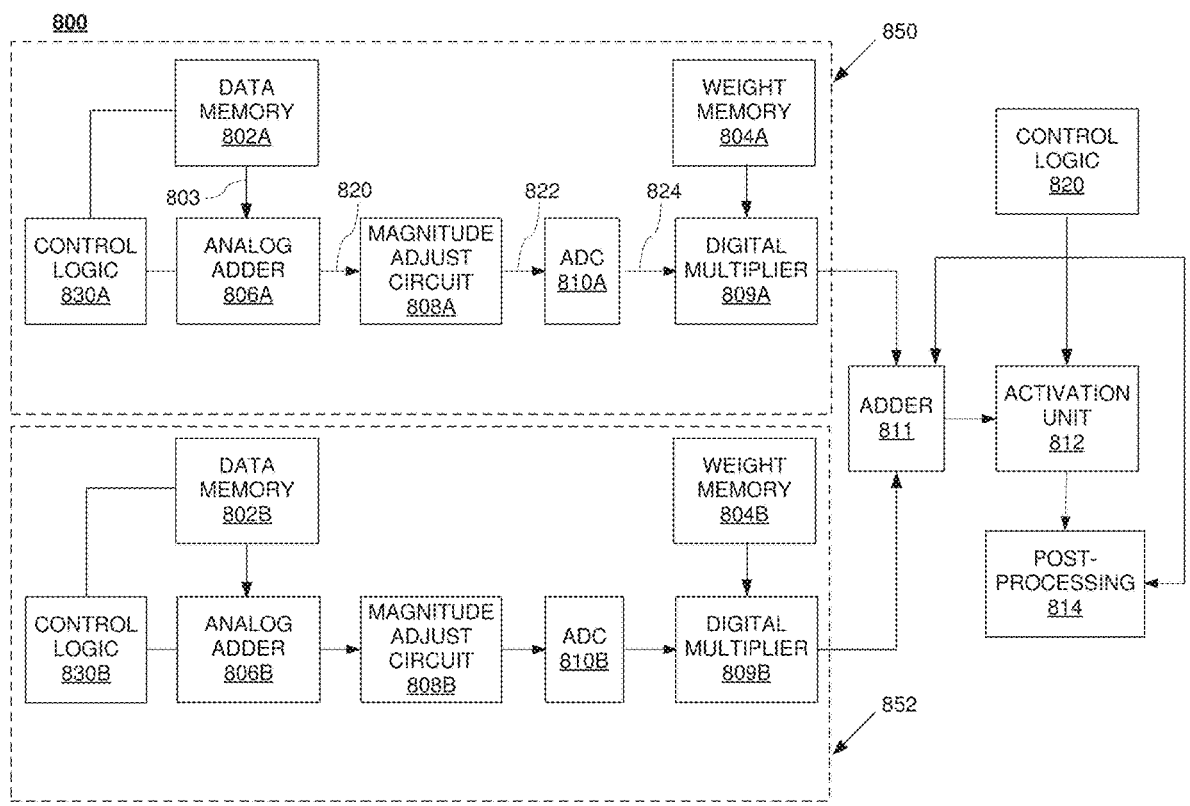
FIG. 8 illustrates a simplified matrix multiplication system utilizing column weights, according to various embodiments of the present disclosure.

FIG. 8 illustrates a simplified matrix multiplication system utilizing column weights, according to various embodiments of the present disclosure. System 800 sub-circuits 850, 852 that each may comprise data memory (e.g., 802A), weight memory (e.g., 804A), analog adder (e.g., 806A), magnitude adjustment circuit (e.g., 808A), ADC 810A, 810B, digital multiplier (e.g., 806A). System 800 may further comprise digital adder 811, activation unit 812, post-processing unit 814, and controller 820 that may be shared between sub-circuits 850 and 852, respectively.

In operation, analog adder (e.g., 806A) may add data 803 from data memory 802A to output sums 820. In embodiments, sums 820 are input to magnitude adjustment circuit 808A that adjusts, in the analog domain, magnitudes of sums 820 and outputs magnitude-adjusted values 822. In embodiments, magnitude-adjusted values 822 may then be converted, e.g., by ADC 810A, into a digital format 824 and multiplied, e.g., by digital multiplier 809A, with weights from weight memory 804A. In embodiments, adder 811 adds the outputs of digital multipliers 809A and 809B to generate an output to which an activation function(s) may be applied, e.g., by activation unit 812. Post-processing unit 814 may apply one or more post-processing steps to the output of activation unit 812, e.g., under the control of controller 830A.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A matrix multiplication system comprising:
a sub-circuit comprising:
a magnitude adjustment circuit that adjusts magnitudes of values, which have been obtained from a data memory, to generate magnitude-adjusted values; and
a multiplier that multiples the magnitude-adjusted values with a column weight to obtain a partial product;
an adder that adds outputs of one or more multipliers to obtain a sum of partial products; and
an activation that applies an activation function to the sum of partial products to generate a matrix multiplication result.

2. The matrix multiplication system according to claim 1, further comprising an ADC that converts the magnitude-adjusted values to digital data.

3. The matrix multiplication system according to claim 1, wherein the magnitude-adjusted values are analog values.

4. The matrix multiplication system according to claim 1, further comprising a state machine that controls at least the the sub-circuit.

5. The matrix multiplication system according to claim 1, wherein the first sub-circuit comprises a switch that enables a current based on a state of a data bit, the data bit being associated with the magnitude of values.

6. The matrix multiplication system according to claim 5, wherein currents are added to generate an output current that represents a number of bits.

7. The matrix multiplication system according to claim 1, wherein the first column weight is shared among two or more sub-circuits.

8. A method for performing an analog matrix multiplication, the method comprising:
using an analog multiplication circuit to multiply bits of data items with weights to obtain products that correspond to sets of currents;
adding two or more currents in the sets of currents to generate a sum of partial dot products in a matrix multiplication;
weighting an output current, which is associated with the sum, according to a bit position to generate a result; and
applying an activation function to the result to generate a matrix multiplication result.

9. The method according to claim 8, wherein the analog multiplication circuit comprises switches that switch the set of currents.

10. The method according to claim 9, wherein the switches switch the set of currents based on a state of weight bits and a state of a data bit.

11. The method according to claim 9, wherein the set of currents comprises different values that represent different weight bits.

12. The method according to claim 10, wherein one or more of the different weight bits comprises a sign bit.

13. The method according to claim 9, wherein the output current is converted by an ADC that is shared by two or more circuits, the ADC applies an analog activation function to the converted current.

14. The method according to claim 9, further comprising a state machine that controls the analog multiplication circuit.

15. An analog multiplication circuit comprising:
a set of switches that represents at least one of a set of weight bits and a set of data bits for currents flowing through the set of switches, the analog multiplication circuit performing steps comprising:
multiplying data bits from the set of data bits with weight bits from the set of weight bits to obtain products that correspond to a set of currents; and
adding at least some of the currents flowing through the set of switches to obtain an output current that represents a sum of partial dot products in a matrix-multiplication.

16. The analog multiplication circuit according to claim 15, wherein a ratio of the currents flowing in the first set of switches and the second set of switches are related by powers of 2 to enable binary data representation.

17. The analog multiplication circuit according to claim 15, wherein the currents flowing through the first set of switches and the second set of switches have a same polarity.

18. The analog multiplication circuit according to claim 15, wherein the currents flowing through the first set of switches and the second set of switches are weighted according to a bit position.

19. The analog multiplication circuit according to claim 15, wherein a negative current negates a weight.

20. The analog multiplication circuit according to claim 15, further comprising a third set of switches that represents sign bits for currents flowing through the third set of switches.

* * * * *